United States Patent Office
2,993,910
Patented July 25, 1961

2,993,910
PRODUCTION OF 2,3-DIHYDROFURANES
Peter Dimroth and Heinrich Pasedach, Ludwigshafen (Rhine), Germany, assignors to Badische Anilin- & Soda-Fabrik Aktiengesellschaft, Ludwigshafen (Rhine), Germany
No Drawing. Filed May 18, 1959, Ser. No. 813,650
Claims priority, application Germany May 29, 1958
6 Claims. (Cl. 260—346.1)

This invention relates to a process for the production of 2,3-dihydrofuranes from alkane diols-(1,4)-by simultaneous catalytic dehydrogenation and dehydration.

It is known from German patent specification No. 699,645, to dehydrogenate butane-diol-(1,4) to gamma-butyrolactone. According to German patent specification No. 832,291, it is possible by the use of copper-cobalt spinel to direct the dehydrogenation so that gamma-hydroxybutyraldehyde is formed as well as gamma-butyrolactone.

By dehydrogenation with copper chromite, pentane-diol-(1,4) gives gamma-valerolactone (cf. for example Am. Soc. 68, page 1385). The same literature reference describes the same reaction in the presence of organic acids, which gives gamma-acetopropanol as well as gamma-valerolactone. U.S. patent specification No. 2,444,301, describes the dehydrogenation of pentane-diol-(1,4) with copper chromite and active silica gel and this also gives about 40% of gamma-acetopropanol besides gamma-valerolactone. 2-methyl-4,5-dihydrofurane is indicated as an intermediate product. It is formed partly by the actual dehydrogenation and partly by the subsequent dehydrating redistillation of the distillation products from gamma-acetopropanol. The production of 2,3-dihydrofuranes by the method of the U.S. patent specification No. 2,444,301, is unsatisfactory, because the yields are small (less than 40% of the theory) and because it is not generally applicable. Thus 2,3-dihydrofurane cannot be obtained from butane-diol-(1,4). An improved process for the dehydration of gamma-acetopropanol to 2-methyl-4,5-dihydrofurane by distillation with catalytic amounts of non volatile acids is described in U.S. patent specification No. 2,758,118.

From hexane-diol-(2,5) there are formed by dehydrogenation, 5-hydroxy-hexanone-(2), acetonyl acetone or also methylcyclopentanone (A. 596, 160; German patent specification No. 859,466).

2,3-dihydrofurane has hitherto been prepared by isomerization of 2,5-dihydrofurane which in turn is obtainable by dehydration of butene-diol-(1,4) (German patent specification No. 817,921, U.S. patent specification No. 2,758,118).

Since 2,3-dihydrofurane is a valuable initial material for the production of polymers, pharmaceutical products and pesticides, it was desirable to find a simple process for the production of 2,3-dihydrofuranes in good yields, which did not have the said disadvantages of the known methods.

We have now found that 2,3-dihydrofuranes are obtained in a simple way and in good yields by treating an alkane-diol-(1,4) in the liquid phase at elevated temperature with a catalyst which contains cobalt metal.

The reaction, which proceeds with simultaneous dehydrogenation and dehydration, may be represented in the case of butane-diol-(1,4) by the following equation:

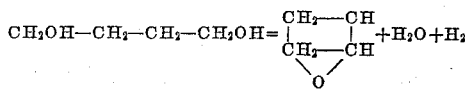

Suitable alkane-diols-(1,4) are butane-diol-(1,4) and alkyl-substituted butane-diols-(1,4). It is preferable to use butane-diols-(1,4) which are substituted by lower alkyl radicals with up to about 3 carbon atoms, especially those which contain the substituents on the carbon atoms which bear the hydroxyl groups. The hydroxyl groups of the substituted butane-diols-(1,4) may thus be primary, secondary or tertiary. It is necessary, however, that at least one hydroxyl group be primary or secondary. Compounds suitable for the process, other than butane-diol-(1,4), are, inter alia, 1-methyl-butane-diol-(1,4), 2-methyl-butane-diol-(1,4), 2,3-dimethyl-butane-diol-(1,4), 1-ethyl-butane-diol-(1,4), 1-propyl-butane-diol-(1,4), 2-ethyl-butane-diol-(1,4), 1,4 - dimethyl-butane-diol-(1,4), 1-ethyl-4-methyl-butane-diol-(1,4), 1 - isopropyl-4-ethyl-butane-diol-(1,4), 1,1-dimethyl-butane-diol-(1,4), 1-ethyl-1-methyl-butane-diol-(1,4) and 1,4,4 - trimethyl-butane-diol-(1,4). The alkane-diols-(1,4) are obtained for example by the reaction of acetylene or acetylene alcohols, such as propargyl alcohol and butine-(1)-ol-(3), with ketones or aldehydes.

The catalysts contain cobalt, advantageously applied to a carrier. They preferably also contain additives which promote the dehydrogenation and/or the dehydration. Examples of such additives are metals such as zinc, manganese, copper, silver, palladium and chromium, and also phosphoric acid or acid phosphates. The proportion of metallic cobalt may be varied within wide limits. It is possible for example to use catalysts which consist almost exclusively of cobalt, as for example Raney cobalt. Good results are also obtained however with carrier catalysts which contain only a few percent of cobalt by weight. In general it is advantageous to use carrier catalysts which have a cobalt content of 10 to 30% by weight. The said additives are preferably used in amounts of 0.1 to 10% by weight with reference to cobalt metal and carrier. Of the carriers, those are preferred which are known as dehydration catalysts. There may be used, inter alia, aluminum oxide, silica gel, and aluminum phosphate.

The catalysts may be prepared for example by mixing the oxides, if desired with the addition of water, shaping the mixture, heating the shaped pieces and reducing the reducible portion with hydrogen at elevated temperature, preferably from 300 to 450° C. Instead of the oxides, there may also be used other compounds converted into oxides by heating, such as nitrates, carbonates, hydrogen carbonates, hydroxides, basic carbonates and acetates. In another method of preparation, the metals are precipitated from solutions of their salts in the presence of the carrier as hydroxides or carbonates, the precipitated mixture is dried and then further treated as described above.

The reaction preferably tages place at temperatures between 160° and 250° C., advantageously between 190° and 230° C.

In some cases it is advantageous to add a high boiling organic acid to the reaction mixture. This is especially so when a carrier-free catalyst, such as Raney cobalt or when a so-called basic carrier, as for example pumice, is used as the carrier. Suitable organic acids have carbon numbers of about between 6 and 20, preferably between 8 and 18. Examples of such acids are caproic acid, caprylic acid, capric acid, lauric acid, palmitic acid and stearic acid. They are in general added in amounts of 0.01 to 2% by weight with reference to the initial material.

The reaction may for example be carried out by heating the alkane-diol-(1,4) with the catalyst at the reaction temperature while stirring. Hydrogen and water are split off and the reaction product distils over together with the water. At the rate at which the amount of alkane-diol-(1,4) diminishes in the reactor, fresh initial material is allowed to flow in. The condensate separates into two layers. It is preferable to add thereto a small amount of caustic alkali solution, for example one-tenth normal caustic soda solution, in order to prevent hydrolysis of the 2,3-dihydrofurane. The same effect is obtained by strongly cooling the condensate and freezing the water. In any case it is recommended that the reaction product be continuously separated from the water. This is especially true of the production of substituted 2,3-dihydrofuranes which hydrolyze more readily than does 2,3-dihydrofurane itself. Moreover, it is advantageous to expel the reaction product quickly by additionally blowing an inert gas into the reaction mixture. The use of a high boiling diluent is also advantageous in some circumstances. All compounds which boil above the reaction temperature and which are indifferent under the conditions of the process, such as decahydronaphthalene, paraffin oil and the distillation residues of a previous batch, are suitable.

According to the new process, for example 1,3-dihydrofurane is obtained in one stage from butane-diol-(1,4). According to the known method, it is necessary first to convert the less accessible butene-diol-(1,4) into 2,5-dihydrofurane and then isomerize this to 2,3-dihydrofurane in a second stage.

The 2,3-dihydrofuranes obtainable according to the new process are suitable as initial materials for the production of polymers, pharmaceutical products and pesticides.

The following examples will further illustrate this invention but the invention is not restricted to these examples. The parts specified in the examples are parts by weight.

*Example 1*

2000 parts of butane-diol-(1,4), 30 parts of stearic acid and 200 parts of a catalyst obtained by reduction of a mixture of 20% of cobalt oxide, 1% of manganese oxide and 79% of silica gel are introduced into a stirring vessel, and heated to 210° C. while stirring. Hydrogen and water are split off and a mixture of water and 2,3-dihydrofurane distils over slowly. The reaction temperature is regulated so that the transition temperature of the distillate does not exceed 100° C. Towards the end of the reaction the reaction temperature amounts to 235° C. At the rate at which the water and 2,3-dihydrofurane distil off, a further 16,000 parts of butane-diol-(1,4) are allowed to flow in.

A total of 50 parts of one-tenth normal caustic soda solution is added continuously to the distillate and the latter is separated continuously into water and organic phase by means of a water overflow. 12,400 parts of crude product are obtained which, after fine distillation, yield 9940 parts, i.e. 76% of the theory, of pure 2,3-dihydrofurane of the boiling point 54.3° C. The product has the refractive index $n\ 20/D = 1.4232$.

*Example 2*

The procedure of Example 1 is followed but no stearic acid is added and a catalyst is used which has been obtained by reduction of a mixture of 20% of cobalt oxide, 1% of zinc oxide and 79% of aluminum oxide. 11,100 parts of 2,3-dihydrofurane are obtained, i.e. 79% of the theory.

*Example 3*

The procedure of Example 1 is followed but 200 parts of Raney cobalt are used as catalyst and a moderate stream of hydrogen is blown through the reaction material. 8400 parts of 2,3-dihydrofurane are obtained, i.e. 60% of the theory.

*Example 4*

The procedure of Example 2 is followed but a catalyst is used which contains, besides 20% of cobalt, 1% of zinc and 79% of silica gel., 0.3% of phosphoric acid. 11,950 parts of 2,3-dihydrofurane are obtained, i.e. 86% of the theory.

*Example 5*

Under the conditions described in Example 1, 20,080 parts of 1-methyl-butane-diol-(1,4) are reacted. The temperature of the reaction mixture rises from 195° to 220° C. 15,100 parts of a mixture of 2-methyl-2,3-dihydrofurane and 5-methyl-2,3-dihydrofurane in about the ratio 60:40 are obtained. The boiling range lies between 68° and 83° C. and the yield amounts to 89% of the theory.

*Example 6*

The procedure of Example 2 is followed, but 23,600 parts of 1,4-dimethyl-butane-diol-(1,4) are reacted. The water is immediately frozen out from the distillate. 17,640 parts of 2,5-dimethyl-2,3-dihydrofurane of the boiling point 92.3° C. are obtained, i.e. 90% of the theory.

*Example 7*

The procedure of Example 2 is followed but a catalyst is used which contains 20% of cobalt, 2% of zinc and 1% of manganese on 77% of aluminum phosphate. 9100 parts of 2,3-dihydrofurane are obtained corresponding to 65% of the theory.

*Example 8*

The procedure of Example 1 is followed but a catalyst is used which contains 20% of cobalt, 3% of zinc, 0.5% of palladium and 76.5% of silica gel. The yield of 2,3-dihydrofurane amounts to 10,150 parts, corresponding to 73% of the theory.

*Example 9*

The procedure of Example 1 is followed but a catalyst is used which contains 20% of cobalt, 6% of copper, 3% of zinc and 71% of silica gel. 10,400 parts of 2,3-dihydrofurane are obtained, corresponding to a yield of 75% of the theory.

*Example 10*

11,000 parts of 1,1-dimethyl-butane-diol-(1,4) are reacted in the manner described in Example 1 instead of butane-diol-(1,4), and there are obtained 5100 parts of 2,2-dimethyl-2,3-dihydrofurane of the boiling point 78° C. and having the refractive index $n\ 25/D = 1.4005$. The yield corresponds to 41% of the theory.

*Example 11*

3000 parts of decahydronaphthalene, 200 parts of butane-diol-(1,4), 5 parts of stearic acid and 100 parts of the catalyst described in Example 1 are charged into a stirring vessel and heated while stirring. Splitting off of hydrogen commences at 180° C. and a mixture of water, 2,3-dihydrofurane and small amounts of decahydronaphthalene are distilled off through a distillation attachment. The temperature of the reaction mixture is kept such that the transition temperature of the distillate does not exceed 110° C. The distillate is continuously separated in the manner described in Example 1. Butane-diol-(1,4) and deacahydronaphthalene are added to the reaction vessel at the rate at which these substances distil over. The content of butane-diol-(1,4) in the reaction mixture is kept below about 5% because otherwise the catalyst tends to agglomerate.

The yield of 2,3-dihydrofurane, after the usual working up, is 9780 parts, corresponding to 79% of the theory.

*Example 12*

The procedure of Example 1 is followed but there are introduced initially into the reactor only 500 parts of butane-diol-(1,4) and 2000 parts of a mixture which has been obtained as residue in a previous batch. The remaining butane-diol-(1,4) is added at the rate at which the 2,3-dihydrofurane distils over. 10,250 parts of 2,3-dihydrofurane are obtained, corresponding to 82% of the theory.

*Example 13*

The procedure of Example 1 is followed but 1% of 2-ethylhexane acid is used instead of stearic acid. 9400 parts of 2,3-dihydrofurane are obtained corresponding to 75% of the theory.

What we claim is:

1. A process for the production of 2,3-dihydrofurane which comprises heating a compound selected from the group consisting of butanediol-(1,4) and alkyl substituted butanediols-(1,4), said alkyl radicals having from 1 to 3 carbon atoms in the liquid phase at a temperature between about 160° C. and 250° C. and in the presence of cobalt metal as a catalyst, and thereafter recovering the 2,3-dihydrofurane formed in the process.

2. A process as in claim 1 wherein a fatty acid having from 6 to 20 carbon atoms in its carbon chain is added to the reaction mixture, the amount of said fatty acid being from about 0.01% to 2% by weight with reference to the initial compound.

3. A process as in claim 1 wherein the reaction products are removed during the reaction and wherein dilute caustic alkali solution is added to the condensate causing the immediate separation of 2,3-dihydrofurane from the water formed in the process.

4. A process as in claim 1 wherein the reaction is carried out in the presence of a solvent boiling above the reaction temperature, which solvent is indifferent under the conditions of the process.

5. A process as in claim 1 wherein the cobalt metal is applied to a carrier, and wherein the cobalt content of the carrier catalyst is between 10% and 30% by weight.

6. A process as in claim 5 wherein an activator is included with said cobalt metal, said activator being selected from the group consisting of zinc, manganese, copper, silver, palladium, chromium, and phosphoric acid, the amount of said activator being from about 0.1% to about 10% by weight with reference to the cobalt metal and carrier.

References Cited in the file of this patent

UNITED STATES PATENTS

| | | |
|---|---|---|
| 2,444,301 | Kyrides et al. | June 29, 1948 |
| 2,556,325 | Fluchaire | June 12, 1951 |